US012671354B2

(12) United States Patent
Ye et al.

(10) Patent No.: US 12,671,354 B2
(45) Date of Patent: Jun. 30, 2026

(54) SYSTEM AND METHOD FOR DETERMINING AN ANGULAR POSITION OF AN ELECTRIC MOTOR

(71) Applicant: STMICROELECTRONICS INTERNATIONAL N.V., Geneva (CH)

(72) Inventors: Luting Ye, Shanghai (CN); Jian Wang, Shanghai (CN); Xiaobo Sun, Shanghai (CN)

(73) Assignee: STMICROELECTRONICS INTERNATIONAL N.V., Gevena (CH)

( * ) Notice: Subject to any disclaimer, the term of this patent is extended or adjusted under 35 U.S.C. 154(b) by 189 days.

(21) Appl. No.: 18/422,744

(22) Filed: Jan. 25, 2024

(65) Prior Publication Data

US 2025/0247028 A1      Jul. 31, 2025

(51) Int. Cl.
*H02P 6/14*            (2016.01)
*H02P 6/16*            (2016.01)

(52) U.S. Cl.
CPC ...................................... *H02P 6/16* (2013.01)

(58) Field of Classification Search
CPC ......................................................... H02P 6/16
USPC ...................................................... 318/400.04
See application file for complete search history.

(56) References Cited

U.S. PATENT DOCUMENTS

2006/0132076 A1* 6/2006 Finsinger ................... H02P 6/15
                                                                318/400.02
2009/0066324 A1   3/2009 Nagamoto 2010/0007294 A1* 1/2010 Hasegawa ............ G01D 5/2451
                                                                318/400.04
2011/0101899 A1* 5/2011 Manabe .................... H02P 6/16
                                                                318/400.04
2013/0334993 A1* 12/2013 Jang .......................... H02P 6/17
                                                                318/400.04
2015/0073745 A1* 3/2015 Mizuno ................ G01D 3/0365
                                                                702/147
2019/0296667 A1   9/2019 Guo et al.
2021/0331737 A1   10/2021 Patel et al.
2024/0103480 A1* 3/2024 Lin .......................... H02P 21/34

FOREIGN PATENT DOCUMENTS

JP             2011117769 A      6/2011
WO      WO 2020/031943 A1      2/2020

* cited by examiner

*Primary Examiner* — Gabriel Agared
(74) *Attorney, Agent, or Firm* — Alston & Bird LLP

(57)                    ABSTRACT

In accordance with various embodiments of the present disclosure, an integrated circuit for determining an angular position of an electric motor having a rotatable shaft and a resolver is provided. In some embodiments, the integrated circuit comprises (i) an angle sampling module adapted to receive a signal from the resolver and to repeatedly determine, at an angle sampling rate, the angular position of the rotatable shaft using the signal from the resolver, (ii) an interpolation module to determine an interpolated value of the angular position of the rotatable shaft at each cycle of a motor control loop rate, and (iii) a motor control module adapted to provide a pulse width modulated (PWM) signal to the motor. The PWM signal is based at least in part on the determined interpolated value of the angular position of the rotatable shaft determined at each cycle of the motor control loop rate.

12 Claims, 4 Drawing Sheets

SYSTEM AND METHOD FOR DETERMINING AN ANGULAR POSITION OF AN ELECTRIC MOTOR

FIELD OF THE INVENTION

Example embodiments of the present disclosure relate generally to electric motors and, more particularly, to integrated circuits, processing systems, and methods for determining an angular position of an electric motor.

BACKGROUND

In electric motor control applications, it is often necessary to know the angular position (or, simply, the angle) of the motor's rotor (which may also be termed the rotor angle), such as to accurately control the torque of the motor. This angle may be designated as θ (theta). One conventional method of determining the angular position of the motor's rotor is to use a resolver coupled to the motor. A resolver is a device having a rotating winding that is excited with a high-frequency signal and two stationary windings positioned at 90 degrees to each other. Current flows through the rotating winding which induces current in the stationary, two-phase windings. The two two-phase windings, being positioned at 90 degrees to each other, produce a sine and cosine feedback current. The relative magnitudes of the two-phase voltages are measured and used to determine the angle of the rotor relative to the stator. The angle can be computed using "arctangent" function, phase locked loops, or other known techniques.

Applicant has identified many technical challenges and difficulties associated with using a resolver to determine the angular position of an electric motor. Through applied effort, ingenuity, and innovation, Applicant has solved problems related to using a resolver to determine the angular position of an electric motor by developing solutions embodied in the present disclosure, which are described in detail below.

BRIEF SUMMARY

Various embodiments described herein related to integrated circuits, processing systems, and methods for determining an angular position of an electric motor.

In accordance with various embodiments of the present disclosure, an integrated circuit for determining an angular position of an electric motor having a rotatable shaft and a resolver is provided. In some embodiments, the integrated circuit comprises (i) an angle sampling module adapted to receive a signal, directly or indirectly, from the resolver of the electric motor and to repeatedly determine, at an angle sampling rate, the angular position of the rotatable shaft using the signal from the resolver, (ii) an interpolation module to determine an interpolated value of the angular position of the rotatable shaft at each cycle of a motor control loop rate, and (iii) a motor control module adapted to provide a pulse width modulated (PWM) signal, directly or indirectly, to the motor. The PWM signal is based at least in part on the determined interpolated value of the angular position of the rotatable shaft determined at each cycle of the motor control loop rate. A frequency of the PWM signal is variable. The motor control loop rate is variable and corresponds to the frequency of the PWM signal.

In some embodiments, each determined interpolated value of the angular position is based on (i) a respective most recent determined rotational speed of the rotatable shaft of the motor multiplied by (ii) an elapsed time since a respective most recent determination of the angular position of the rotatable shaft using the signal from the resolver, a result of which is added to the respective most recent determination of the angular position of the rotatable shaft using the signal from the resolver.

In some embodiments, the respective most recent determined rotational speed of the rotatable shaft of the motor is based on a difference between (i) the respective most recent determination of the angular position of the rotatable shaft using the signal from the resolver and (ii) a respective determination of the angular position of the rotatable shaft using the signal from the resolver that immediately precedes the most recent determination of the angular position of the rotatable shaft using the signal from the resolver divided by a time difference between (1) the respective most recent determination of the angular position of the rotatable shaft using the signal from the resolver and (2) the respective determination of the angular position of the rotatable shaft using the signal from the resolver that immediately precedes the most recent determination of the angular position of the rotatable shaft using the signal from the resolver.

In some embodiments, the angle sampling rate is synchronized with a whole period or a half period of an excitation signal of the resolver.

In accordance with various embodiments of the present disclosure, a processing system for determining an angular position of an electric motor having a rotatable shaft and a resolver is provided. In some embodiments, the processing system comprises (i) angle sampling circuitry module adapted to receive a signal, directly or indirectly, from the resolver of the electric motor and to repeatedly determine, at an angle sampling rate, the angular position of the rotatable shaft using the signal from the resolver, (ii) interpolation circuitry to determine an interpolated value of the angular position of the rotatable shaft at each cycle of a motor control loop rate, and (iii) motor control circuitry adapted to provide a pulse width modulated (PWM) signal, directly or indirectly, to the motor, wherein the PWM signal is based at least in part on the interpolated value of the angular position of the rotatable shaft determined at each cycle of the motor control loop rate. A frequency of the PWM signal is variable. The motor control loop rate is variable and corresponds to the frequency of the PWM signal.

In accordance with various embodiments of the present disclosure, a method determining an angular position of an electric motor having a rotatable shaft and a resolver is provided. In some embodiments, the method comprises receiving a signal, directly or indirectly, from the resolver of the electric motor, repeatedly determining, at an angle sampling rate, the angular position of the rotatable shaft using the signal from the resolver, determining an interpolated value of the angular position of the rotatable shaft at each cycle of a motor control loop rate, and providing a pulse width modulated (PWM) signal, directly or indirectly, to the motor. The PWM signal is based at least in part on the interpolated value of the angular position of the rotatable shaft determined at each cycle of the motor control loop rate. A frequency of the PWM signal is variable. The motor control loop rate is variable and corresponds to the frequency of the PWM signal.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
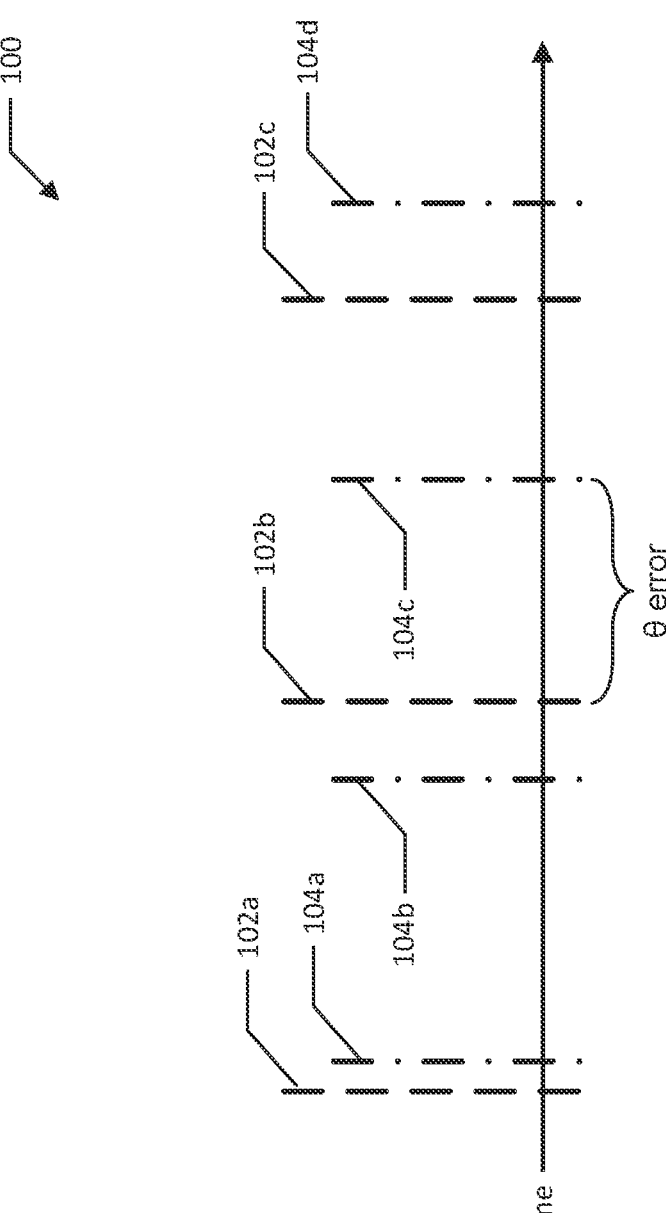
FIG. 1 illustrates an example timeline of angle sampling events and motor control loop events of an example system for determining an angular position of an electric motor, in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

When using a resolver to determine the rotor angle of an electric motor, the high-frequency signal provided to the resolver may be termed an exciting signal. The rate at which the angle is determined (i.e., the angle sampling rate) is synchronized with the resolver exciting signal and may be determined every cycle or every half cycle of the exciting signal. For example, for an exciting signal having a frequency of 10 kilohertz (kHz), the angle sampling rate may be 10 KHz (i.e., every cycle) or 20 kHz (i.e., every half cycle). Each time the resolver signal is analyzed and the rotor angle determined may be termed an "angle sampling event."

A pulse width modulated (PWM) control signal, having a frequency and duty cycle, is sent from a motor control unit to the motor to control the motor current. A motor control loop monitors and (as needed) adjusts the PWM control signal to the motor at a desired rate (termed the motor control loop rate). Each time the motor control unit monitors and (as needed) adjusts the PWM control signal may be termed a "motor control event." The motor control loop rate should be the same as the PWM frequency for proper motor control.

To accurately determine the rotor angle, the angle sampling rate should be the same as the motor control loop rate (and therefore the PWM frequency). If the angle sampling rate is not the same as the motor control loop rate, there will be errors in the determined rotor angles. This is illustrated in FIG. 1. FIG. 1 illustrates an example timeline 100 of angle sampling events and motor control loop events of an example system for determining an angular position of an electric motor is illustrated in accordance with some embodiments of the present disclosure. FIG. 1 illustrates three angle sampling events 102a, 102b, 102c (the dashed lines) and four motor control events 104a, 104b, 104c, 104d (the dot-dash lines). In the illustrated example, the motor control events 104a-d occur at a higher rate than the angle sampling events 102a-c. The angle errors (designated in FIG. 1 as "0 error") is based on the difference in time between each angle sampling event and each motor control event. In the illustrated example, the angle sampling event 102b determines the rotor angle at that time, but when the following motor control event 104c occurs the rotor angle will have changed and therefore an incorrect rotor angle would be used by the motor control unit.

One approach that has been used to avoid such angle errors is to ensure that the angle sampling rate is the same as the motor control loop rate (and therefore the PWM frequency). However, in some circumstances, it may be desirable to vary the PWM frequency (and therefore the motor control loop rate).

Various embodiments of the present disclosure overcome the above technical challenges and difficulties and provide various technical improvements and advantages based on, for example, but not limited to, providing example integrated circuits, processing systems, and methods for determining an angular position of an electric motor having a resolver when the angle sampling rate differs from the motor control loop rate. Various embodiments of the present disclosure are used with three phase or multiphase electric motors that have resolvers for detecting rotor angle, such as but not limited to Permanent Magnet Synchronous Motors (PMSM).

Various embodiments of the present disclosure involve calculating a rotor angle of a motor when a motor control event occurs by interpolating from two immediately preceding angle sampling events. Various embodiments of the present disclosure involve using a timer that determines the elapsed time between the two immediately preceding angle sampling events and a timer (which may be the same timer) that determines the elapsed time between the motor control event and the immediately preceding angle sampling event.

Various embodiments of the present disclosure involve using those timer values to calculate (a) the motor speed and (b) the difference between the rotor angle when the motor control event occurs and the rotor angle at the immediately preceding angle sampling event and using that difference to calculate the rotor angle when the motor control event occurs.

Various embodiments of the present disclosure involve calculating a rotor angle of a motor when a frequency of a pulse width modulated (PWM) signal provided to the motor is variable when a motor control loop rate is variable and corresponds to the frequency of the PWM signal.

Figure 2:
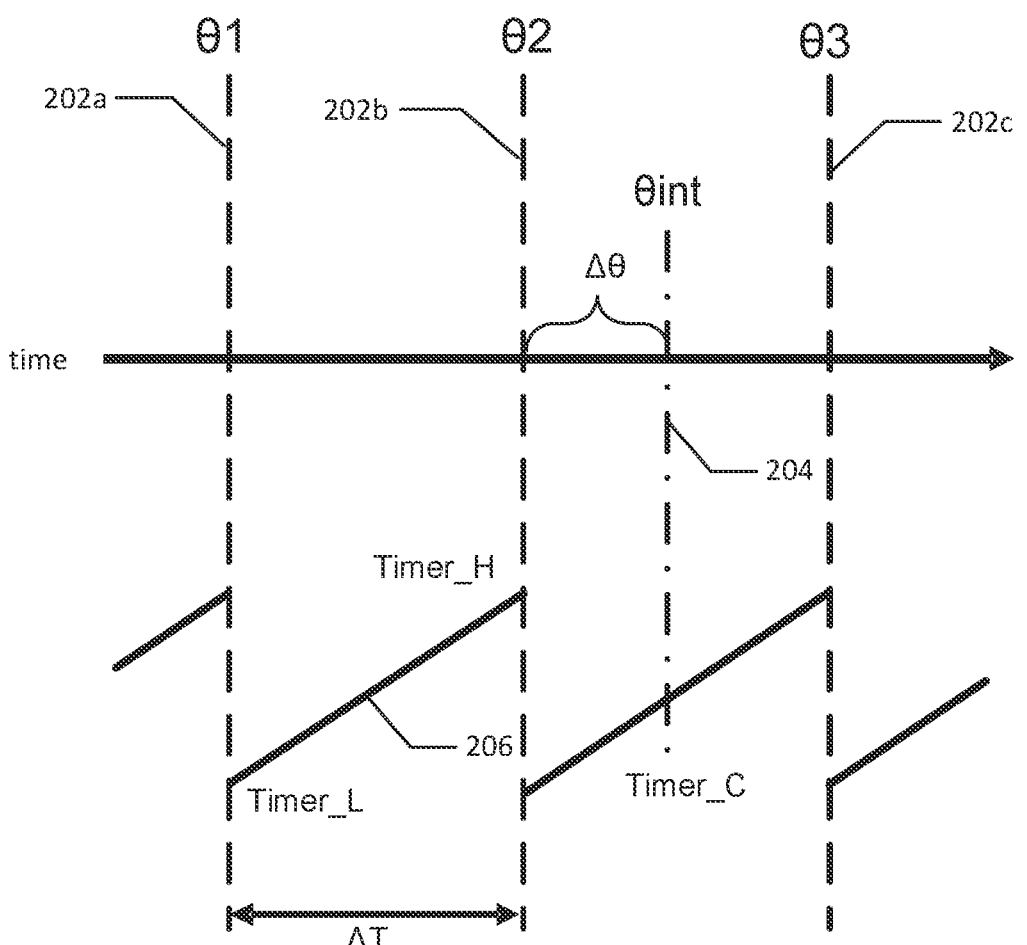
FIG. 2 illustrates an example event timeline of an example system for determining an angular position of an electric motor, in accordance with some embodiments of the present disclosure.

Referring now to FIG. 2, an example event timeline 200 of an example system for determining an angular position of an electric motor is illustrated in accordance with some embodiments of the present disclosure. FIG. 2 illustrates three angle sampling events 202a, 202b, 202c (the dashed lines), producing three angle determinations θ1, θ2, θ3. FIG. 2 illustrates one motor control event 204 (the dot-dash line) (other motor control events that may be in this timeframe are omitted for simplicity). As illustrated in FIG. 2, the motor control event 204 is not synchronized with any of the three angle sampling events 202a, 202b, 202c, such that none of the determined angles θ1, θ2, θ3 accurately correspond to the motor control event 204, and the rotor angle at the time of the motor control event needs to be calculated to accurately control the motor. The rotor angle at the time of the motor control event is labeled as $\theta_{int}$ in FIG. 2 because this rotor angle is interpolated, as described below.

In various embodiments of the present disclosure, a timer 206 is used that is (re) started at each angle sampling event (shown in FIG. 2 as timer value=Timer_L) and stopped/reset at the next angle sampling event (shown in FIG. 2 as timer value=Timer_H). Thus, the time between two angle sampling events (ΔT) is determined by the equation: ΔT=Timer_H−Timer_L. The rotational speed of the motor is determined by the equation: Speed=(θ2−θ1)/ΔT, where θ2 is the rotor angle determined at the angle sampling event 202b immediately preceding the motor control event 204 and θ1 is the rotor angle determined at the angle sampling event 202a immediately prior to that.

In various embodiments, when a motor control event occurs, a timestamp of the timer is captured (shown in FIG. 2 as timer value=Timer_C). Because of the inertia of the motor, the speed of the motor at the time of the motor control event 204 can be assumed to be unchanged from the above motor speed determination. Thus, in various embodiments the difference between the rotor angle $\theta_{int}$ when the motor control event 204 occurs and the rotor angle (θ2 in this example) at the immediately preceding angle sampling event 202b may be termed 40 and is calculated using the equation: Δθ=Speed*(Timer_H−Timer_C). In various embodiments, this difference is used to calculate the rotor angle when the motor control event occurs using the equation: $\theta_{int}$=θ2+Δθ. In various embodiments, the above-described process for determining the rotor angle is performed every time a motor control event occurs and at approximately the same time.

Figure 3:
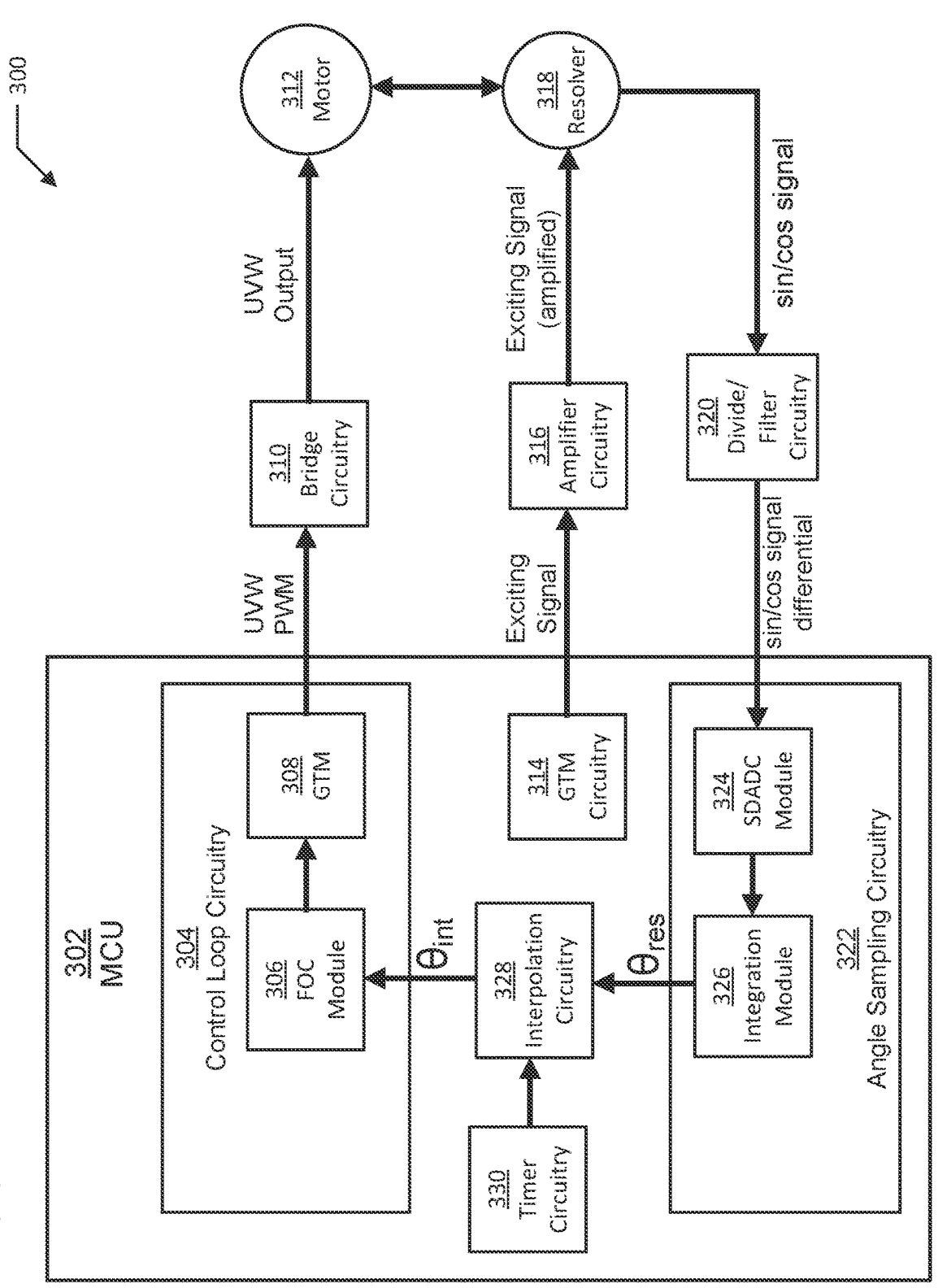
FIG. 3 is an example block diagram illustrating an example system for determining an angular position of an electric motor, in accordance with an example embodiment of the present disclosure.

Referring now to FIG. 3, an example block diagram illustrating an example system for determining an angular position of an electric motor is illustrated in accordance with an example embodiment of the present disclosure. In the illustrated embodiment, the example system 300 comprises a microcontroller (MCU) 302 functioning as a motor control unit controlling a motor 312 having a resolver 318. The MCU 302 comprises control loop circuitry 304, which in turn comprises a field-oriented control (FOC) module 306 and a generic timer module (GTM) 308. The MCU 302 further comprises angle sampling circuitry 322, which in turn comprises an analog-to-digital converter (e.g., a Sigma-Delta ADC) module 324 and an integration module 326. The MCU 302 further comprises another GTM 314, interpolation circuitry 328, and timer circuitry 330.

The modules of the control loop circuitry 304 work together to receive the rotor angle (which is, in various embodiments of the invention, an interpolated rotor angle $\theta_{int}$) and output a PWM signal (labeled UVW PWM) for each of the three phases (U,V,W) of the motor 312 to control the operation of the motor 312. The PWM signal is provided to a bridge circuitry 310, such as an H-bridge, which provides a UVW output to the motor 312. In various embodiments, the bridge circuitry 310 is like a pre-driver which can increase the 0~5V level PWM signal as needed.

In the illustrated example, the GTM 314 generates an exciting signal (e.g., a 10 kHz signal) which is amplified by an amplifier circuitry 316 to provide an amplified exciting signal to the resolver 318. During operation of the motor 312, the resolver 318 outputs a two-phase sin/cos signal to a divide/filter circuitry 320 which determines a sin/cos signal differential. The sin/cos signal differential is input to the SDADC module 324, and the digital output of the SDADC module 324 is provided to the integration module 326 which uses the digital value of the sin/cos signal differential to determine the rotor angle $\theta_{res}$ (this rotor angle is termed $\theta_{res}$ because it is the rotor angle value determined directly from the resolver output). The rotor angle $\theta_{res}$ is repeatedly determined at the angle sampling rate. As described above, the angle sampling rate is typically the same as the frequency of the exciting signal (i.e., every cycle) or twice the frequency of the exciting signal (i.e., every half cycle).

The rotor angle $\theta_{res}$ is provided to the interpolation circuitry 328. The timer circuitry 330 determines the times of the angle sampling events and the motor control events, as described above. The interpolation circuitry 328 uses the rotor angle $\theta_{res}$ and the times from the timer circuitry 330 to determine an interpolated rotor angle $\theta_{int}$, as described above. In some embodiments, a single timer may be used to determine the times of the angle sampling events and the motor control events, while in some other embodiments separate timers may be used to determine the times of the angle sampling events and the motor control events. In various embodiments, the interpolation circuitry 328 uses the rotor angle $\theta_{res}$ and the times from the timer circuitry 330 to determine an interpolated rotor angle $\theta_{int}$ repeatedly at the motor control loop rate (which, as described above, is preferably the frequency of the PWM signal). The interpolation circuitry 328 provides the interpolated rotor angle $\theta_{int}$ to the control loop circuitry 304 for use in controlling the motor 312.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitries both leverage use of the same processor(s), memory(ies), circuitry(ies), and/or the like to perform their associated functions such that duplicate hardware is not required for each set of circuitry.

Figure 4:
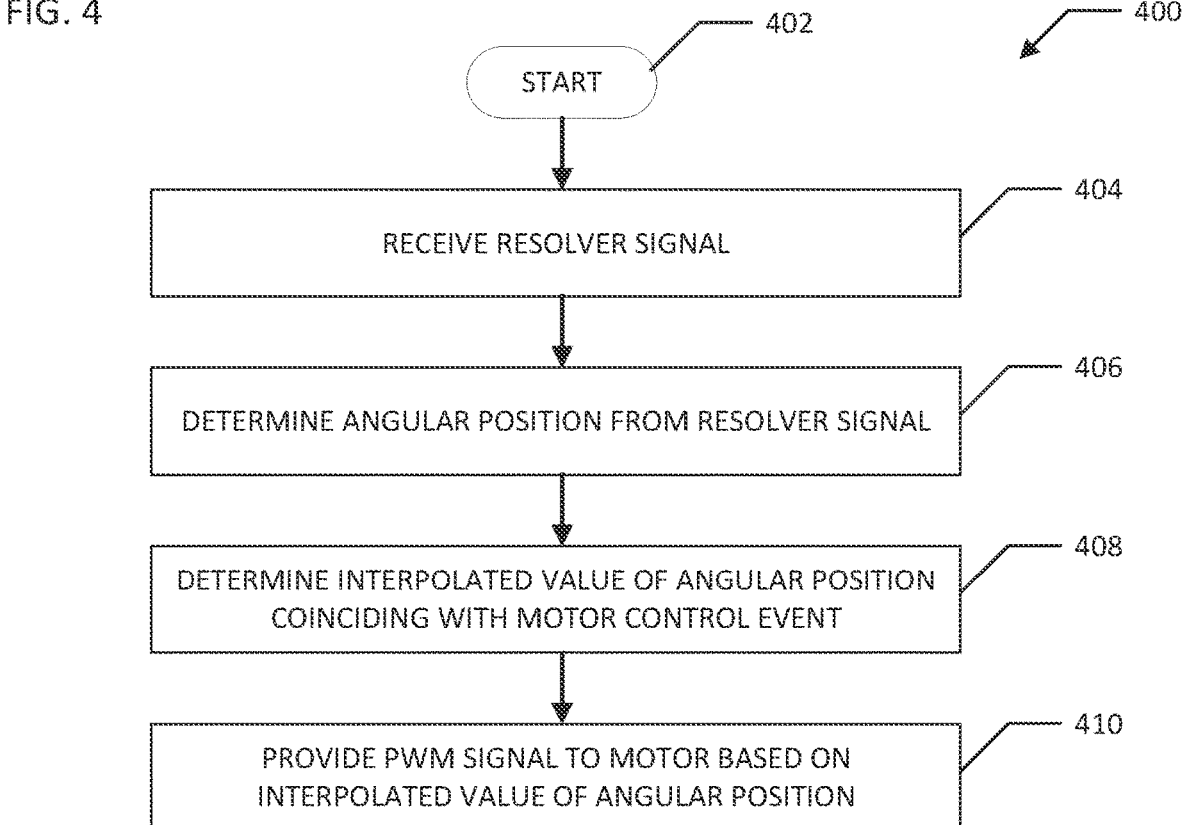
FIG. 4 an example flow diagram illustrating an example method for determining an angular position of an electric motor, in accordance with an example embodiment of the present disclosure.

Reference will now be made to FIG. 4, which provides a flowchart illustrating example steps, processes, procedures, and/or operations in accordance with various embodiments of the present disclosure. Various methods described herein, including, for example, example methods as shown in FIG. 4, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 4 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Having described example systems, apparatuses, computing environments, and user interfaces associated with embodiments of the present disclosure, example flowcharts including various operations performed by the circuits, apparatuses, systems, and/or devices described herein will now be discussed. It should be appreciated that each of the flowcharts depicts an example process that may be performed by one or more of the circuits, apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur concurrently rather than sequentially. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. In regards to the below flowchart(s), one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, re-ordered, and/or otherwise altered as described herein.

Referring now to FIG. 4, an example flow diagram illustrating an example method 400 for determining an angular position of an electric motor having a rotatable shaft and a resolver in accordance with some embodiments of the present disclosure is illustrated. In some embodiments, the example method 400 may be implemented by an example system described herein, including, but not limited to, the example system 300 described above in connection with FIG. 3.

In the example method shown in FIG. 4, the example method 400 starts at step/operation 402. At step/operation 404, one or more components of a system (such as, but not limited to, the angle sampling circuitry 322 of the MCU 302 described above in connection with FIG. 3) continuously receives a signal, directly or indirectly, from a resolver of an electric motor (such as, but not limited to, the resolver 318 of the motor 312 described above in connection with FIG. 3). As described above, in various embodiments the signal from the resolver is a two-phase sin/cos signal.

At step/operation 406, one or more components of a system (such as, but not limited to, the angle sampling circuitry 322 of the MCU 302 described above in connection with FIG. 3) repeatedly, at an angle sampling rate, uses the signal from the resolver to determine a rotor angle $\theta_{res}$ of a rotatable shaft of the motor.

At step/operation 408, one or more components of a system (such as, but not limited to, the interpolation circuitry 328 of the MCU 302 described above in connection with FIG. 3) determines an interpolated value of the rotor angle $\theta_{int}$ of the rotatable shaft at each cycle of a motor control loop rate.

At step/operation 410, one or more components of a system (such as, but not limited to, the control loop circuitry 304 of the MCU 302 described above in connection with FIG. 3) provides a PWM signal, directly or indirectly, to the motor (such as motor 312 described above in connection with FIG. 3). As described above, the PWM signal is based at least in part on the interpolated value of the rotor angle $\theta_{int}$ of the rotatable shaft determined at each cycle of the motor control loop rate.

In some embodiments, the example method shown in FIG. 4 continuously repeats.

Some or all of the functionality described herein may be implemented as part of an integrated circuit (IC) to perform, for example, one or more functions described herein.

The processing elements described herein, such as the control circuitry, may include one or more processors, input/output circuitry, data storage media, communications circuitry, and/or other components configured to perform compute operations. In some embodiments, the data storage media may be configured to store information, data, content, applications, instructions, or the like, for enabling the processing elements described herein to carry out various functions. As such, in some embodiments, the processing elements described herein may be referred to as functional logic. The processing elements described herein may be embodied in a number of different ways, for example, in some embodiments, the processing elements described herein may include one or more processing devices configured to perform independently. Additionally or alternatively, in some embodiments, the processing elements described herein may include one or more processor(s) configured in tandem via a bus to enable independent execution of instructions, pipelining, and/or multithreading. The use of the terms "controller," "processor," "control circuitry," and "processing circuitry" should be understood to include a single core processor, a multi-core processor, multiple processors internal to the processing elements described herein, and/or one or more remote or "cloud" processor(s) external to the processing elements described herein.

In an example embodiment, the processing elements described herein may be configured to execute instructions stored in the data storage media or otherwise accessible to the processor. Alternatively or additionally, the processing elements described herein in some embodiments is configured to execute hard-coded functionality. As such, whether configured by hardware or software methods, or by a combination thereof, the processing elements described herein represent an entity (e.g., physically embodied in circuitry) capable of performing operations according to an embodiment of the present disclosure while configured accordingly. Alternatively or additionally, as another example in some example embodiments, when the processing elements described herein is embodied as an executor of software instructions, the instructions specifically configure the processing elements described herein to perform the algorithms embodied in the specific operations described herein when such instructions are executed.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure. While this detailed description has set forth some embodiments of the present disclosure, the appended claims cover other embodiments of the present disclosure which differ from the described embodiments according to various modifications and improvements. For example, the appended claims can cover any form of system, device, integrated circuit, or method which uses a resolver for determining an angular position of an electric motor.

Within the appended claims, unless the specific term "means for" or "step for" is used within a given claim, it is not intended that the claim be interpreted under 35 U.S.C. 112, paragraph 6.

What is claimed is:

1. An integrated circuit for determining an angular position of an electric motor having a rotatable shaft and a resolver, the integrated circuit comprising:
   an angle sampling module to repeatedly determine, at an angle sampling rate, the angular position of the rotatable shaft based, directly or indirectly, on a signal from the resolver;
   an interpolation module to determine an interpolated value of the angular position of the rotatable shaft at each cycle of a motor control loop rate; and
   a motor control module to provide a pulse width modulated (PWM) signal, directly or indirectly, to the motor, wherein the PWM signal is based at least in part on the determined interpolated value of the angular position of the rotatable shaft determined at each cycle of the motor control loop rate;
   wherein a frequency of the PWM signal is variable; and
   wherein the motor control loop rate is variable and corresponds to the frequency of the PWM signal.

2. The integrated circuit of claim 1, wherein each determined interpolated value of the angular position is based on (i) a respective most recent determined rotational speed of the rotatable shaft of the motor multiplied by (ii) an elapsed time since a respective most recent determination of the angular position of the rotatable shaft using the signal from the resolver, a result of which is added to the respective most recent determination of the angular position of the rotatable shaft using the signal from the resolver.

3. The integrated circuit of claim 2, wherein the respective most recent determined rotational speed of the rotatable shaft of the motor is based on a difference between (i) the respective most recent determination of the angular position of the rotatable shaft using the signal from the resolver and (ii) a respective determination of the angular position of the rotatable shaft using the signal from the resolver that immediately precedes the most recent determination of the angular position of the rotatable shaft using the signal from the resolver divided by a time difference between (1) the respective most recent determination of the angular position of the rotatable shaft using the signal from the resolver and (2) the respective determination of the angular position of the rotatable shaft using the signal from the resolver that immediately precedes the most recent determination of the angular position of the rotatable shaft using the signal from the resolver.

4. The integrated circuit of claim 1, wherein the angle sampling rate is synchronized with a whole period or a half period of an excitation signal of the resolver.

5. A processing system for determining an angular position of an electric motor having a rotatable shaft and a resolver, the processing system comprising:

angle sampling circuitry module to repeatedly determine, at an angle sampling rate, the angular position of the rotatable shaft based, directly or indirectly, on a signal from the resolver;

interpolation circuitry to determine an interpolated value of the angular position of the rotatable shaft at each cycle of a motor control loop rate; and motor control circuitry to provide a pulse width modulated (PWM) signal, directly or indirectly, to the motor, wherein the PWM signal is based at least in part on the interpolated value of the angular position of the rotatable shaft determined at each cycle of the motor control loop rate;

wherein a frequency of the PWM signal is variable; and wherein the motor control loop rate is variable and corresponds to the frequency of the PWM signal.

6. The processing system of claim 5, wherein each determined interpolated value of the angular position is based on (i) a respective most recent determined rotational speed of the rotatable shaft of the motor multiplied by (ii) an elapsed time since a respective most recent determination of the angular position of the rotatable shaft using the signal from the resolver, a result of which is added to the respective most recent determination of the angular position of the rotatable shaft using the signal from the resolver.

7. The processing system of claim 6, wherein the respective most recent determined rotational speed of the rotatable shaft of the motor is based on a difference between (i) the respective most recent determination of the angular position of the rotatable shaft using the signal from the resolver and (ii) a respective determination of the angular position of the rotatable shaft using the signal from the resolver that immediately precedes the most recent determination of the angular position of the rotatable shaft using the signal from the resolver divided by a time difference between (1) the respective most recent determination of the angular position of the rotatable shaft using the signal from the resolver and (2) the respective determination of the angular position of the rotatable shaft using the signal from the resolver that immediately precedes the most recent determination of the angular position of the rotatable shaft using the signal from the resolver.

8. The processing system of claim 5, wherein the angle sampling rate is synchronized with a whole period or a half period of an excitation signal of the resolver.

9. A method for determining an angular position of an electric motor having a rotatable shaft and a resolver, the method comprising:

receiving a signal based directly or indirectly on a signal from the resolver of the electric motor;

repeatedly determining, at an angle sampling rate, the angular position of the rotatable shaft using the signal from the resolver;

determining an interpolated value of the angular position of the rotatable shaft at each cycle of a motor control loop rate; and providing a pulse width modulated (PWM) signal, directly or indirectly, to the motor, wherein the PWM signal is based at least in part on the interpolated value of the angular position of the rotatable shaft determined at each cycle of the motor control loop rate;

wherein a frequency of the PWM signal is variable; and wherein the motor control loop rate is variable and corresponds to the frequency of the PWM signal.

10. The method of claim 9, wherein each determined interpolated value of the angular position is based on (i) a respective most recent determined rotational speed of the rotatable shaft of the motor multiplied by (ii) an elapsed time since a respective most recent determination of the angular position of the rotatable shaft using the signal from the resolver, a result of which is added to the respective most recent determination of the angular position of the rotatable shaft using the signal from the resolver.

11. The method of claim 10, wherein the respective most recent determined rotational speed of the rotatable shaft of the motor is based on a difference between (i) the respective most recent determination of the angular position of the rotatable shaft using the signal from the resolver and (ii) a respective determination of the angular position of the rotatable shaft using the signal from the resolver that immediately precedes the most recent determination of the angular position of the rotatable shaft using the signal from the resolver divided by a time difference between (1) the respective most recent determination of the angular position of the rotatable shaft using the signal from the resolver and (2) the respective determination of the angular position of the rotatable shaft using the signal from the resolver that immediately precedes the most recent determination of the angular position of the rotatable shaft using the signal from the resolver.

12. The method of claim 9, wherein the angle sampling rate is synchronized with a whole period or a half period of an excitation signal of the resolver.

* * * * *